Patented Apr. 6, 1954

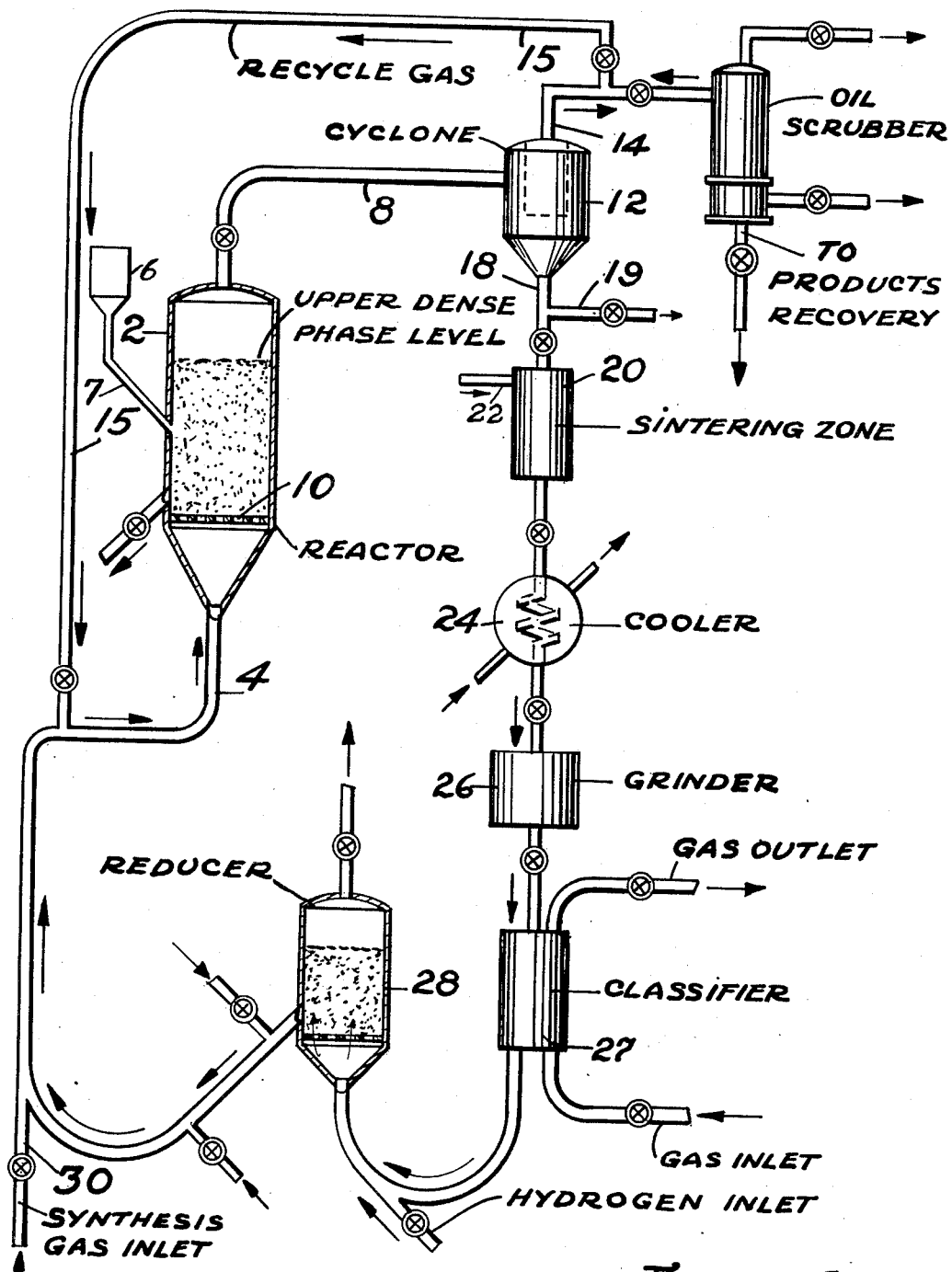

2,674,611

UNITED STATES PATENT OFFICE 2,674,611

HYDROCARBON SYNTHESIS PROCESS

Charles E. Hemminger, Westfield, N. J., assignor to Standard Oil Development Company, a corporation of Delaware Application February 1, 1949, Serial No. 73,959

6 Claims. (Cl. 260—449.6)

The present invention relates to improvements in the operation of a hydrocarbon synthesis plant. More particularly, it relates to improvements in the operation of a hydrocarbon synthesis process employing fluidized catalyst technique so that normally liquid hydrocarbons and oxygenated hydrocarbons can be manufactured from carbon monoxide and hydrogen more economically and efficiently than has heretofore been possible.

The synthesis of hydrocarbons from carbon monoxide and hydrogen is a matter of record. The Fischer-Tropsch synthesis for hydrocarbons has been described in patents and other technical literature. A study of this literature reveals that in the early history of this particular art, hydrocarbons were synthesized by contacting them at elevated temperatures with a cobalt-containing catalyst. It shows also that later, iron containing promotional amounts of activators, such as $K_2CO_3$ was employed as the catalyst and that the temperatures in this later developed process were somewhat higher than in the cobalt process. More recently a great deal of laboratory and pilot plant experimentation has been carried out in this country with the object in view of applying fluid catalyst technique to the hydrocarbon synthesis process. For example, a considerable amount of research work has been and is now being carried out employing powdered iron as a catalyst in the synthesis of hydrocarbons from gaseous mixtures containing carbon monoxide and hydrogen. It has been found that the iron-employing process yields a gasoline fraction of improved anti-detonation quality.

The present invention goes to the matter of improving the fluidized catalyst technique as applied to hydrocarbon synthesis from carbon monoxide and hydrogen where the catalyst is powdered iron. Research in laboratory and pilot plant operation has revealed that the reaction between carbon monoxide and hydrogen results in the deposition of carbonaceous material on the powdered iron catalyst, and the forces accompanying such deposition cause fragmentation and/or disintegration of the catalyst to particle sizes which can not be well fluidized. In other words, the synthesis of hydrocarbons as indicated above has presented to the industry problems with which they were not confronted in the development of the catalytic cracking of hydrocarbon oils employing the fluid catalyst technique.

Another problem presented by the application of the fluid solids technique to the hydrocarbon synthesis reaction is the fouling and consequent inactivation of the catalyst by the formation and deposition of waxy materials and the tendency of catalyst particles to agglomerate as a result of the wax formation and deposition. Wax deposition due to catalyst inactivation not only cuts down product yield but causes poor fluidization of the catalyst, poor temperature control, agglomeration of catalyst, and conditions requiring shut down of the plant.

In the course of investigation of the factors that cause wax formation in the hydrocarbon synthesis reaction and the manner in which such formation interferes with fluidization, it has been found that one of the ways wherein wax interferes with fluidization is by accumulation of wax on any relatively cool walls within the reactor. Fine catalyst particles make contact with this wax, are wetted thereby, and the resulting agglomerate falls into the reactor and causes poor fluidization and/or coking. Thus it has been found that, for example, in a fluid type operation only about 20–25% by weight of wax can be tolerated on the catalyst before it causes sticking together of catalyst particles, thus preventing proper aeration and fluidization, which are essential for the operation of the fluid type process. Thus catalyst fines material present in the reactor are conducive to catalyst agglomeration in the manner described above.

It has also been found that catalyst fines are to a great extent, responsible for the formation of wax and wax-like material. Factors promoting formation of these high boiling solids and semi-solids are (a) a high alkali metal salt promoter content, greater than about 1.5% on the catalyst; (b) the state of oxidation of the catalyst, and (c) low heat transfer coefficient. It has been found that the finer catalyst, in size about 0–20 microns, usually contains the highest concentration of promoter, which increases the wax accumulation on this portion of the catalyst. It has also been established that catalyst fines oxidize far more readily and extensively under synthesis conditions than fluidizable particles of larger size; the accumulation of these oxidized fine particles in the reactor causes increased wax formation. Then to the lower heat transfer coefficients associated with the non-fluidizable fine particles in the reactor, the jacket temperature is usually lowered to maintain a given average temperature. Consequently colder walls are presented to the catalyst and the accumulation of wax on these colder walls and their subsequent return to the fluidized bed as indicated above occurs.

Beside the problem of wax formation, catalyst fines in the fluidized bed have also caused fluidization difficulties. Thus as carbon formation increased and accompanying catalyst disintegration became pronounced, fluidization became increasingly difficult, heat transfer and control increasingly poorer, and plant shut down resulted.

It is the principal object of the present invention to separate and remove catalyst fines from the dense bed of the fluid solids hydrocarbon synthesis reactor.

Another object of the present invention is to minimize formation of wax in the synthesis reaction.

Another object of the present invention is also to minimize the formation of fines in a fluid solids hydrocarbon synthesis reaction process.

Other and further objects of the invention will appear from the following more detailed description.

The present invention discloses a method of removing catalyst fines of about 0–20 micron diameter from the dense phase reaction zone as rapidly as they are formed. Prior and heretofore it has been customary to entrain fine sized catalyst from the dense bed by the fluidizing reactants and the vaporous product stream, pass the entrained stream first through a disengaging zone wherein the bulk of the entrained catalyst is removed from the gas stream and returned to the dense bed, then passed through a gas-solids separation zone, such as a cyclone, filter, electrical precipitator, etc., and the fines thus removed are returned to the fluidized bed. This return of fine size particles to the fluid bed, however, though it maintains the catalyst inventory, is accompanied by the disadvantageous results enumerated above.

In accordance with the present invention, however, catalyst fines are not returned to the fluidized bed, but are taken overhead entrained in and along with the gaseous fluidizing medium and separated therefrom. The fines, instead of being returned to the dense bed, may advantageously be then sent to a catalyst regenerating zone, wherein the catalyst is regenerated by known processes.

This total fines entrainment feature is characterized by numerous advantages. By removing fines from the reaction zone and by preventing their build-up therein by returning them as prior art showed, wax formation is substantially minimized because of the reasons cited. Furthermore, considerably more carbon is associated with fines than there is with coarser fluidized catalyst particles. Thus analyses conducted on catalyst samples withdrawn in the course of a large scale pilot plant run have shown a sharp gradient of carbon content versus the particle size of the catalyst with which the carbon is associated. A Roller analysis indicated the following:

| Roller Fraction | Percent Carbon | | |
| --- | --- | --- | --- |
| 0–20 Micron | 54.8 | 63.9 | 61.8 |
| 20–40 Micron | 6.9 | 14.1 | 13.1 |
| 40–80 Micron | 4.2 | 5.7 | 8.1 |
| 80+ Micron | 3.3 | 4.4 | 4.8 |

By removal of the fines and the consequent removal of a substantial part of the carbon from the reactor, the fluid bed density is substantially increased, since carbon has a low fluidized density. The high carbon content of the catalyst fines makes them readily susceptible to oxidative regeneration. The removal of fines from the catalyst bed leaves the latter with substantially higher heat transfer and fluidization characteristics than if the fines were returned and allowed to build up in the dense bed. Furthermore, though it has long been recognized that it is highly desirable to use high gas velocities in the hydrocarbon synthesis reaction in order to increase throughputs and yields, velocities have generally been limited by entrainment considerations. In accordance with the present invention, wherein catalyst fines are taken overhead without return as such to the dense bed, these entrainment considerations no longer appear, and thus higher throughput rates and gas velocities may be employed than in the conventional synthesis.

Having set forth the general nature, advantages, and objects of the invention, the latter will best be understood from the more detailed description hereinafter in which reference will be made to the accompanying drawing which is a diagrammatic representation of a system suitable for carrying out a preferred embodiment of the invention.

Referring now to the drawing, 2 represents a reactor which is preferably in the form of a vertical cylinder having a lower conical section. A synthesis feed gas mixture of hydrogen and carbon monoxide in the ratio of about 0.5–2.0 mols $H_2$ to 1 mol CO is introduced into reactor 2 through line 4 and flows upward through a screen or grid 10 to effect good gas distribution.

It is generally desirable to remove sulfur compounds and free oxygen from the synthesis gases prior to introduction into the synthesis reactor, and this may be accomplished by any of the processes well known in the art.

Within reactor 2 a mass of iron catalyst, such as sintered reduced pyrites ash, red iron oxide, ammonia synthesis catalyst (fused reduced high purity magnetite containing a small quantity of alumina and potassium promoter), iron microspheres, etc., is maintained in the form of a powder as such or supported on powdered inert carriers as activated charcoal, silica or alumina having a particle size distribution such that less than 5–10% of the particles have diameters 0–20 microns and less than 60% of the particles have diameters larger than 80 microns. This catalyst, which is preferably promoted with an alkali metal compound, such as 0.5–1.5% $K_2CO_3$, $Na_2CO_3$, KF, NaF, etc., may be supplied to reactor 2 from catalyst hopper 6 through line 7.

The superficial velocity of the gases within reactor 2 may be held as high as 1.0 to 1.8 feet per second, although an upper limit of 1.2 to 1.4 feet per second is desirable. It will be understood that lower superficial velocities may be used, satisfactory fluidization ordinarily being obtained as low as 0.3 to 1.0 feet per second, but the high velocity and throughput features and advantages of the invention are not thereby realized. Under these conditions the catalyst in reactor 2 assumes the form of a dense, turbulent mass, resembling a boiling liquid, with a more or less well-defined upper level 12, and an apparent density of about 45 to 85 lbs./cu. ft. depending upon the fluidization conditions, the lower apparent densities being associated with the higher velocities. The amount of synthesis gas supplied to reactor 2 is so controlled that about 5 to 30 normal cubic feet of the gas mixture enters reactor 2 per pound iron catalyst per hour, depending on the intrinsic catalyst activity and the operating temperature.

Within reactor 2, the total pressure is maintained in the range of 50 to 750 p. s. i. g., preferably 100 to 400 p. s. i. g., and the reaction temperature, which may be controlled by any convenient means, such as a cooling jacket or coil (not shown) inside or outside reactor 2, is kept uniform at about 500° to 750° F., preferably at an upper limit of 650° F.

The volatile reaction products and entrained catalyst fines are withdrawn through overhead line 8 and are passed through a conventional gas-solids separator 12, such as a cyclone, filter, or electrical precipitator. This removes the bulk of the entrained catalyst fines from the product vapor stream.

Last traces of catalyst fines may be removed from the product stream by passing the latter through line 14 into oil scrubber 16, wherein the particles not removed in unit 12 are scrubbed in a known manner from the product stream. The latter is then passed to the liquid and gaseous product recovery system for work-up into useful products by any process known per se. Recycle gas may be returned to the reactor through recycle line 15.

Catalyst fines separated from the product stream in separator 12 may be withdrawn through line 18, and if desired, may advantageously be sent to a sintering machine 20 wherein the catalyst fines are subjected to sintering temperatures in the range of 1800° to 2500° F. Part of the heat requirements are furnished by the combustion of the carbonaceous material associated with the fines, and for this purpose oxygen or air may be admitted through line 22. The sintered and agglomerated catalyst is then passed to a quenching zone 24, then to grinding and classification zone 26 wherein, in a manner known per se, the sintered catalyst may be ground to fluidizable particle size and classified by screening, etc. Catalyst of the desired particle size range may be withdrawn from 26, passed to reducer 28, wherein it is treated with a hydrogen-containing gas, thence discharged through line 30 into a stream of gas containing carbon monoxide and hydrogen where it is formed into a suspension which may then be carried to line 4 and with the feed gas in that line into reactor 2.

The embodiment of the invention as shown in the drawing permits of many modifications apparent to those skilled in the art. Thus mention has not been made of various accessory equipment which normally would be used in a commercial plant. Thus in the interest of good heat economy, various heat exchangers and economizers would be employed to utilize whatever heat is available in the most efficient manner and, in order to control the process, pumps, compressors, valves, flow meters, etc. would be included in the equipment. Also, if desired, catalyst may be withdrawn downwardly from the dense bed for periodic regeneration. Not all the fines withdrawn from the gas-solids separator need be sent to the sintering machine, but may be withdrawn through line 19.

The invention will be further illustrated by the following specific example, which represents a large-scale pilot plant operation wherein a preferred embodiment of the invention was carried out. The plant comprised an 8" reactor section about 17 feet high, and had a capacity of about 100 barrels per day.

To illustrate the improvements resulting from the described invention, several examples are cited. In the first example, two operations are compared in which during "A" the fines were not removed from the reactor by entrainment and a build-up of fine catalyst and carbon and a decrease in catalyst density in the reactor resulted while in "B," when the fine catalyst and carbon were removed by entrainment, the bulk density increased. At the same time, lower temperature differentials existed in the bed and the selectivity to liquid hydrocarbons was greater with the same carbon yield.

|  | A | B |
|---|---|---|
| Hours of Operation | 289–357 | 417–429 |
| Temperature, °F | 653 | 654 |
| Pressure, p. s. i | 400 | 395 |
| Feed Rate, v./Hr./W | 17 | 28 |
| Recycle/Fresh Feed Ratio | 4.4 | 4.1 |
| Superficial Velocity F/S | .78 | .77 |
| Total Feed Composition: | | |
| Percent $H_2$ | 28 | 20 |
| Percent CO | 8 | 8 |
| Percent $CO_2$ | 31 | 36 |
| Percent $H_2O$ | 4.0 | 1.8 |
| Hydrogen Partial Press, p. s. i | 116 | 82 |
| $H_2$+CO Conversion, Percent | 89 | 95 |
| Yield, cc. $C_4$+/$m^3H_2$+CO Cons | 158 | 201 |
| Catalyst* Inspections: | | |
| Percent 0–20 Mu | 32 | 12 |
| Percent 20–40 Mu | 15 | 8 |
| Percent 40–80 Mu | 20 | 34 |
| Percent 80% Mu | 33 | 46 |
| Percent, Carbon C+O free, start and end of period | 18.7–21.7 | 45–4–22.7 |
| Density, Lbs./Cu. Ft | 68 | 90 |
| Temperature Spread in Reactor, °F | 10 | 6 |
| Carbon Accumulation Rate, Lbs./Carbon/100 Lb. Cat./100 Hrs | 6 | 5 |

*Catalyst—potassium promoted iron powder.

In the second example a run is given in which the fines were retained. Consequently, the catalyst in the bed became very fine and bad temperature resulted in the bed. Also, considerable quantities of wax were formed and it was necessary to resort to hydrogenation in order to remove the wax from the fine catalyst clinging to the reactor walls and return it to the bed. The catalyst here also was iron.

|  | Initial Operations | Before Hydrogenation | After Hydrogenation |
|---|---|---|---|
| Hours | 10–34 | 217–241 | 281–317 |
| Pressure, p. s. i | 405 | 395 | 397 |
| Feed Rate, v./Hr./W | 28 | 34 | 33 |
| Recycle/Fresh Feed Ratio | 2.0 | 2.0 | 1.9 |
| Superficial Vel. F/S | .72 | .90 | .88 |
| Total Feed Composition: | | | |
| Percent $H_2$ | 34 | 42 | 37 |
| Percent CO | 14 | 14 | 13 |
| Percent $CO_2$ | 30 | 28 | 31 |
| Hydrogen Partial Pres., p. s. i | 143 | 176 | 155 |
| $H_2$+CO Conversion | 93 | 85 | 93 |
| Yields, cc. $C_4$+/$m^3H_2$+CO Cons | 170 | 170 | 179 |
| Fluidized Catalyst, Lbs | 260 | 173 | 260 |
| Fluidized Catalyst, Ft | 8 | 28 | 33 |
| Percent 0–20 Mu | 17 | 22 | 58 |
| Percent 20–40 Mu | 17 | 2 | 6 |
| Percent 40–80 Mu | 29 | 17 | 16 |
| Percent 80+ Mu | 37 | 59 | 20 |
| Percent Carbon, C+O free | 8.9 | 24.3 | 36 |
| Density, Lbs./Cu. Ft | 75 | 14 | 19 |
| Avg. Temp., °F | 674 | 681 | 657 |
| Temp. Spread, °F | 8 | 147 | 12 |

It should be pointed out however, that in order further to improve the operation described above, the hydrogen partial pressure of the feed gas entering the reaction zone should be maintained within the limits of from about 125–175 lbs. per square inch since this pressure tends to repress carbon formation in the catalyst and with it fragmentation of the catalyst. This high hydrogen partial pressure is therefore a further and valuable aid in maintaining the catalyst in a fluidizable state for an extended period of time. Also the best operating conditions require a bed density of 40–50 lbs. per cubic foot and after the initial period this may be accomplished by removing fines at the rate of 20–50 per 100 lbs. of catalyst in the reactor every 100 hours. This will remove fines at a rate serving to maintain the bed of catalyst at substantially constant volume and bed density at the superficial velocities hereinbefore disclosed and furthermore since the fines removed contain about 75 parts of carbonaceous deposit per 100 lbs. of the catalyst in which they are deposited, very appreciable quantities of carbonaceous deposits are continuously removed.

Numerous modifications of the invention may be made by those familiar with the present art without departing from the spirit thereof.

What is claimed is:

1. An improved single stage process for producing valuable liquid hydrocarbons from synthesis gas mixtures containing CO and $H_2$ without excessive deposition of waxy and of solid carbonaceous material which comprises feeding synthesis gas containing $H_2$ and CO in synthesis proportions into a dense, fluidized bed of finely divided iron-containing catalyst in a reaction zone, maintaining an upper dense bed level in said reaction zone, maintaining a dilute phase above said dense bed level, maintaining said reaction zone at synthesis conditions of total pressure and temperature maintaining a hydrogen partial pressure of about 125–175 lbs. per sq. inch in said reaction zone, contacting the reactants with said catalyst for a sufficient period of time to obtain the desired conversion, permitting free overhead removal from above said dense bed level of catalyst fines having a particle size below about 20 microns from said reaction zone in order to maintain the bed at a substantially constant aerated volume and recovering from said reaction a product containing hydrocarbons including normally liquid hydrocarbons.

2. The process of claim 1, the steps comprising passing at least a portion of said withdrawn catalyst in succession through a sintering, quenching, grinding, classifying, and reducing zone, and recycling catalyst from said last named zone to said synthesis reaction zone.

3. The process of claim 1 wherein said gas velocities are in the range of 0.7 to 1.5 feet/second.

4. The process of claim 1 wherein the temperature in said reaction zone is in the range of 600° to 700° F. and the pressure within the range of 250 to 450 p. s. i. g.

5. In the synthesis of hydrocarbons effected by the interaction of the oxides of carbon with hydrogen in a reaction zone in the presence of a promoted powdered iron catalyst maintained in the form of a fluidized mass by the upflowing gasiform material charged to and formed during the synthesis reaction, the improvement resulting in maintaining the iron catalyst in a well fluidized state which comprises flowing said gasiform material through said fluidized mass in said reaction zone, maintaining a dense bed level in said reaction zone, maintaining a dilute phase in said reaction zone, maintaining a superficial velocity of the gasiform material in the reaction zone within the limits of 1.2 to 1.4 feet per second whereby fines smaller than about 20 microns are removed by entrainment in the product vapors, withdrawing said reaction products and entrained fines from said reaction zone and separating said fines from said product outside said reaction zone.

6. The process of claim 5 wherein fines are removed at the rate of 20 to 50 pounds per 100 pounds of catalyst per 100 hours.

References Cited in the file of this patent

UNITED STATES PATENTS

| Number | Name | Date |
|---|---|---|
| 2,183,146 | Michael | Dec. 12, 1939 |
| 2,406,851 | Redcay | Sept. 3, 1946 |
| 2,448,279 | Rubin | Aug. 31, 1948 |
| 2,467,803 | Herbst | Apr. 19, 1949 |
| 2,479,420 | Segura | Aug. 16, 1949 |
| 2,483,771 | Holder | Oct. 4, 1949 |
| 2,483,850 | Segura et al. | Oct. 4, 1949 |
| 2,510,823 | Krebs | June 6, 1950 |